(12) United States Patent
Badiozamani et al.

(10) Patent No.: US 11,529,736 B2
(45) Date of Patent: Dec. 20, 2022

(54) SYSTEMS, APPARATUSES, AND METHODS FOR DETECTING ESCALATORS

(71) Applicant: Brain Corporation, San Diego, CA (US)

(72) Inventors: Abdolhamid Badiozamani, San Diego, CA (US); Cristian Eduardo Troncoso Paredes, San Diego, CA (US)

(73) Assignee: Brain Corporation, San Diego, CA (US)

( * ) Notice: Subject to any disclaimer, the term of this patent is extended or adjusted under 35 U.S.C. 154(b) by 0 days.

(21) Appl. No.: 17/345,407

(22) Filed: Jun. 11, 2021

(65) Prior Publication Data

US 2021/0299873 A1 Sep. 30, 2021

Related U.S. Application Data

(63) Continuation of application No. PCT/US2019/065643, filed on Dec. 11, 2019.

(60) Provisional application No. 62/778,030, filed on Dec. 11, 2018.

(51) Int. Cl.
*B25J 9/16* (2006.01)
*B25J 13/08* (2006.01)

(52) U.S. Cl.
CPC ........... *B25J 9/1674* (2013.01); *B25J 9/1653* (2013.01); *B25J 9/1664* (2013.01); *B25J 13/088* (2013.01); *B25J 9/163* (2013.01); *B25J 9/1697* (2013.01)

(58) Field of Classification Search
CPC ...... B25J 9/1674; B25J 9/1653; B25J 9/1664; B25J 13/088; B25J 9/163; B25J 9/1697; G05B 19/31; G05B 19/406; G05B 19/4061; G06T 7/521; G06T 7/60
See application file for complete search history.

(56) References Cited

U.S. PATENT DOCUMENTS

| | | | |
|---|---|---|---|
| 2006/0078182 A1 | 4/2006 | Zwirn et al. | |
| 2017/0031366 A1* | 2/2017 | Shamlian | G05D 1/0242 |
| 2017/0332871 A1 | 11/2017 | Sung et al. | |
| 2018/0178706 A1* | 6/2018 | Takahata | G05D 1/024 |

OTHER PUBLICATIONS

International Search Report for PCT/US19/65643, dated Feb. 28, 2020.

* cited by examiner

*Primary Examiner* — Basil T. Jos
(74) *Attorney, Agent, or Firm* — Reed Smith LLP; Sidharth Kapoor

(57) ABSTRACT

Systems and methods for detecting an escalator in a surrounding environment by a robotic apparatus are disclosed herein. According to at least one exemplary embodiment, an escalator may be determined based on an escalator detection parameter being met. The escalator detection parameter my further require detection of two side walls separated by a distance equal to a width of an escalator and detection of a depreciation in a floor equal to that observed between a stationary portion and a moving first step of an escalator.

17 Claims, 9 Drawing Sheets

| Beam ID | 0 | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|
| Buffer type | Left Wall Buffer | | | | | | Floor Points Buffer | | | | | | | | | Right Wall Buffer | | | | | |
| Height Value | $H_0$ | $H_1$ | $H_2$ | $H_3$ | $H_4$ | $H_5$ | $H_6$ | $H_7$ | $H_8$ | $H_9$ | $H_{10}$ | $H_{11}$ | $H_{12}$ | $H_{13}$ | $H_{14}$ | $H_{15}$ | $H_{16}$ | $H_{17}$ | $H_{18}$ | $H_{19}$ | $H_{20}$ |

FIG. 4

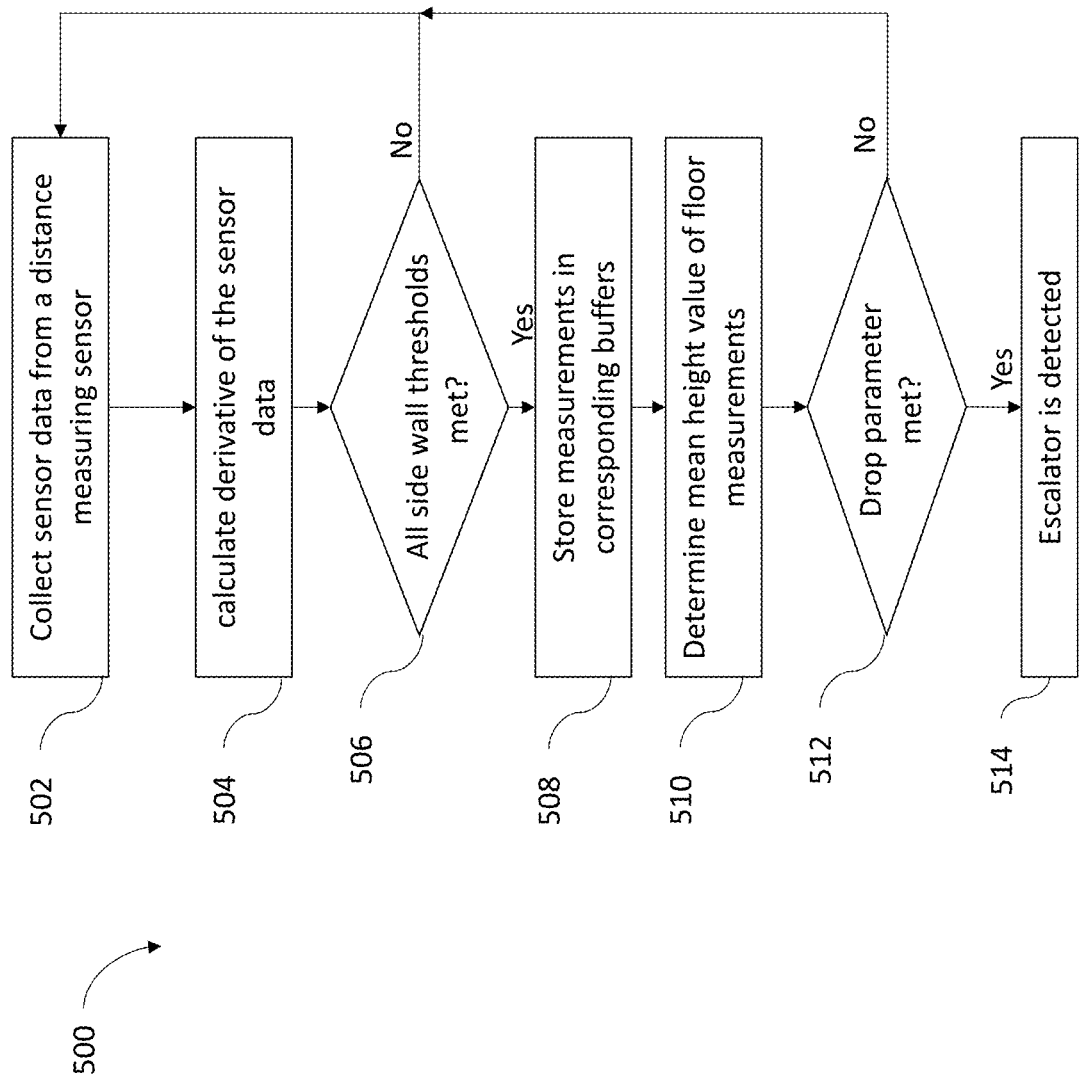

SYSTEMS, APPARATUSES, AND METHODS FOR DETECTING ESCALATORS

PRIORITY

This application is a continuation of International Patent Application No. PCT/US19/65643 filed Dec. 11, 2019 and claims the benefit of U.S. Provisional Patent Application Ser. No. 62/778,030 filed on Dec. 11, 2018 under 35 U.S.C. § 119, the entire disclosure of each are incorporated herein by reference.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technological Field

The present application relates generally to robotics, and more specifically to systems and methods for detecting height drop in a plane, for example by having escalators, within a surrounding environment of a robot.

Background

Currently, many robots comprise one or more distance measuring sensors configured to measure, for example, sharp drops in front of the robots to allow the robots to avoid falling over the sharp drops. Some robots may further utilize imagery, e.g., colorized or greyscale images, to navigate and sense environment obstacles and hazards. Escalators, for example, provide a unique problem to a robot navigating with a distance measuring sensor configured to detect sharp drops as the robot may not detect the drop beyond a first moving step of an escalator until the robot is already on the first moving step.

A robot not configured to detect an escalator prior to the robot moving onto the first moving step of the escalator may be of significant risk of damage to the robot, damage to the escalator, and injury to nearby humans. Accordingly, there is a need in the art for systems and methods for a robot to detect an escalator within a surrounding environment.

SUMMARY

The foregoing needs are satisfied by the present disclosure, which provides for, inter alia, systems and methods for detecting drops in a plane by a robotic device as the robotic device approaches an escalator, for example. The present disclosure is directed towards a specific application of processing LiDAR data to enable robots to detect escalators or moving walkways within their environment. One skilled in the art may appreciate that discussion of escalators is a non-limiting example embodiment to discuss drops in a plane. The below discussion pertains around escalators, but it may also equivalently be applicable to other real-world examples where there is a drop in a plane such as cliffs, staircase, edge of a building, or an edge of a surface that is above the ground level.

Exemplary embodiments described herein have innovative features, no single one of which is indispensable or solely responsible for its desirable attributes. Without limiting the scope of the claims, some of the advantageous features will now be summarized.

According to at least one non-limiting exemplary embodiment, a robotic system is disclosed. The robotic system may comprise a distance measuring sensor configured to collect distance measurements of a floor in front of and nearby a robot to enable the robot to avoid sharp cliffs and obstacles. The robotic system may further comprise a non-transitory computer readable storage medium comprising a plurality of instructions embodied thereon and one or more specialized processors configured to execute the computer readable instructions. The instructions may enable the one or more specialized processors to detect and avoid an escalator within an environment based on data collected by the distance measuring sensor.

According to at least one non-limiting exemplary embodiment, a method for a robot to detect an escalator is disclosed. The method may comprise a controller of the robot to detect two walls separated by a predetermined distance corresponding to the width of an escalator. The method may further comprise detection of a small drop between a stationary floor and a first moving step of an escalator. Upon these two parameters being met, the controller of the robot may determine an escalator and may navigate the robot away from the escalator to avoid damage to the robot, damage to surrounding objects, or injuring nearby people if the robot were to fall down the escalator.

The inventive concepts disclosed are performed by features in specific and particular configuration that make non-abstract improvements to computer technology and functionality. Some of these improvements in computer technology and functionality include executing specialized algorithm by unique and specialized processor(s) that allow the processor to perform faster and more efficiently than conventional processor(s); and requires usage of less memory space as data is collected, analyzed and stored therein. Accordingly, the inventive concepts disclosed herein are an improvement over the conventional technology or prior art directed to maneuvering a robot along a trajectory that is prone to safety risks to itself, humans and objects around it. Lastly, structural components disclosed herein, such as, for example, various sensor units, navigation units, actuator units, communication units and user interface units, are oriented in a specific manner and configuration that is unique to the functioning and operation of the robotic device as it maneuvers along a path.

Inventive concepts disclosed herein are directed to technological improvements that improve computer functionality such that upon execution of algorithms disclosed herein, the computer components function faster and use less memory space.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

FIG. 4 illustrates a data table for storing height measurements corresponding to a left wall, right wall, and floor of an escalator, according to an exemplary embodiment.

FIG. 5 illustrates a process flow diagram for a controller of a robot to determine an escalator within a surrounding environment, according to an exemplary embodiment.

DETAILED DESCRIPTION

Figure 1A:
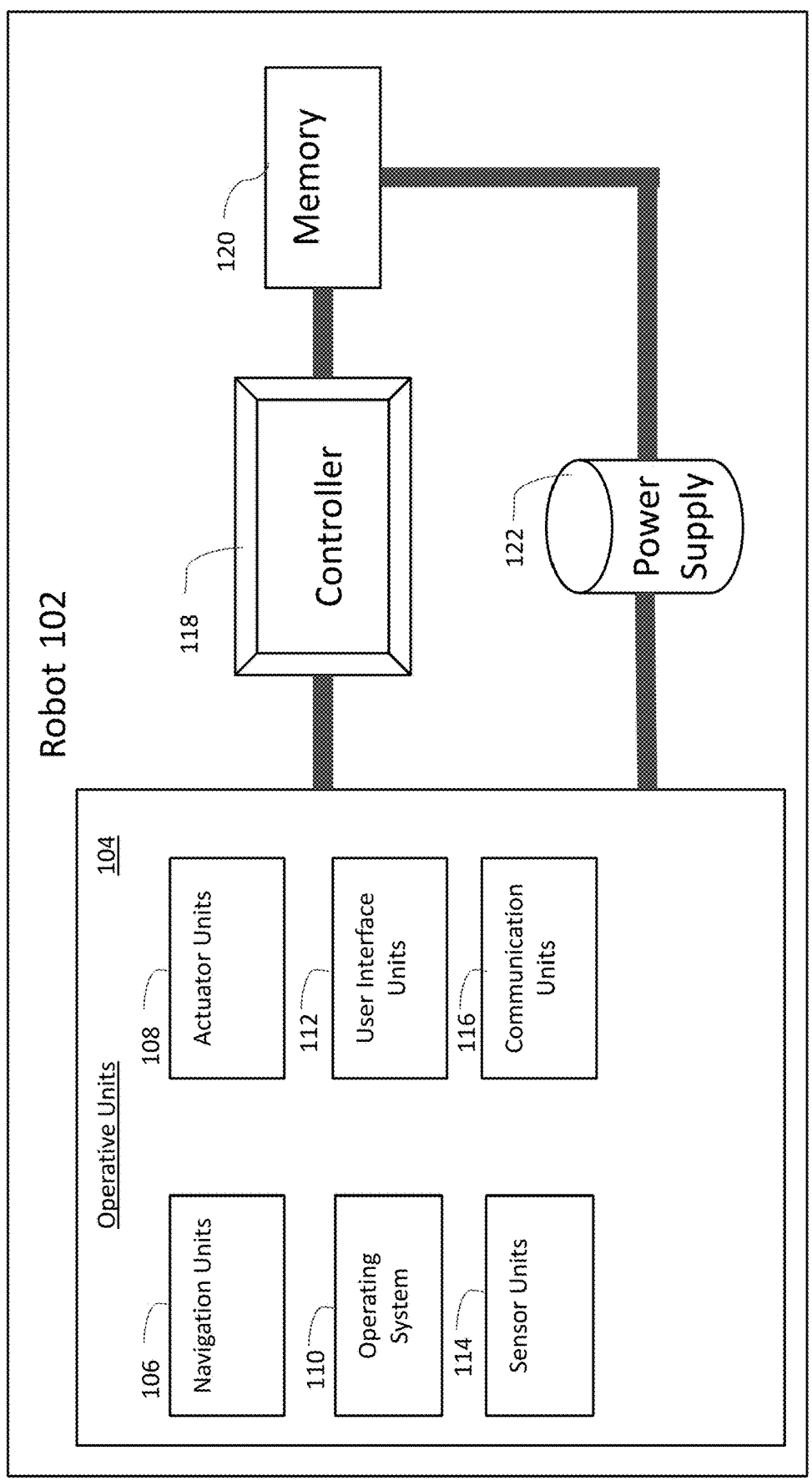
FIG. 1A is a functional block diagram of a main robot in accordance with some embodiments of this disclosure.

Various aspects of the novel systems, apparatuses, and methods disclosed herein are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art would appreciate that the scope of the disclosure is intended to cover any aspect of the novel systems, apparatuses, and methods disclosed herein, whether implemented independently of, or combined with, any other aspect of the disclosure. For example, an apparatus may be implemented or a method may be practiced using any number of the aspects set forth herein. In addition, the scope of the disclosure is intended to cover such an apparatus or method that is practiced using other structure, functionality, or structure and functionality in addition to or other than the various aspects of the disclosure set forth herein. It should be understood that any aspect disclosed herein may be implemented by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, and/or objectives. The detailed description and drawings are merely illustrative of the disclosure rather than limiting, the scope of the disclosure being defined by the appended claims and equivalents thereof.

The present disclosure provides for systems and methods for detecting escalators within a surrounding environment of a robot. As used herein, a robot may include mechanical and/or virtual entities configured to carry out a complex series of tasks or actions autonomously. In some exemplary embodiments, robots may be machines that are guided and/or instructed by computer programs and/or electronic circuitry. In some exemplary embodiments, robots may include electro-mechanical components that are configured for navigation, where the robot may move from one location to another. Such robots may include autonomous and/or semi-autonomous cars, floor cleaners, rovers, drones, planes, boats, carts, trams, wheelchairs, industrial equipment, stocking machines, mobile platforms, personal transportation devices (e.g., hover boards, SEGWAYS®, etc.), stocking machines, trailer movers, vehicles, and the like. Robots may also include any autonomous and/or semi-autonomous machine for transporting items, people, animals, cargo, freight, objects, luggage, and/or anything desirable from one location to another.

As used herein, an escalator may comprise a diagonal step escalator configured to move people or things upward or downward via a moving staircase. An escalator may further comprise a flat escalator configured to translate people or things horizontally across a flat plane via a moving belt. Flat escalators, or moving walkways, typically comprise a plurality of segments which create a moving belt wherein the first moving step, as used herein with reference to flat escalators or moving walkways, may correspond to the first segment of the moving belt of the flat escalator. A robot moving onto a flat escalator at one end may still experience collision with the walls of the escalator as the robot moves onto or away from the belt of the escalator, or may approach a stationary portion of the flat escalator at the opposite end with a velocity which may damage the robot or cause a safety risk for nearby humans. According to at least one non-limiting exemplary embodiment, a robot may be configured to determine and utilize an escalator to transport the robot through an environment.

As used herein, a distance measuring sensor may comprise any sensor configured to determine a distance between the sensor and a target point, the target point being on a surface. For example, a distance measuring sensor may comprise a light detection and ranging (LiDAR) sensor, or other similar optical sensor, configured to measure the distance between the sensor and nearby objects.

As used herein, a height measurement may comprise a height of a target point measured by a distance measuring camera with respect to a flat reference plane at a height of zero (0). The flat reference plane may be a flat floor of which the robot comprising the distance measuring sensor is upon. A distance measurement, as used herein, may comprise the inverse of a height measurement, wherein the distance measurement measures the distance between a distance measuring sensor and a target point. It is appreciated by one skilled in the art that although the embodiments illustrated in the present disclose utilize height measurements, one would expect substantially similar systems and methods to be employed to determine an escalator using distance measurements.

As used herein, a side wall of an escalator may comprise a balustrade and handrail support structure surrounding the moving steps of the escalator.

As used herein, a learning process may comprise teaching a robot a relevant parameter. For example, a robot may learn the width of an escalator by having an operator navigate the robot to an escalator and have the robot measure the width of the escalator using a sensor. The robot may then store the width learned in memory to later reference during determination of an escalator.

As used herein, network interfaces may include any signal, data, or software interface with a component, network, or process including, without limitation, those of the FireWire (e.g., FW400, FW800, FWS800T, FWS1600, FWS3200, etc.), universal serial bus ("USB") (e.g., USB 1.X, USB 2.0, USB 3.0, USB Type-C, etc.), Ethernet (e.g., 10/100, 10/100/1000 (Gigabit Ethernet), 10-Gig-E, etc.), multimedia over coax alliance technology ("MoCA"), Coaxsys (e.g., TVNET™), radio frequency tuner (e.g., in-band or OOB, cable modem, etc.), Wi-Fi (802.11), WiMAX (e.g., WiMAX (802.16)), PAN (e.g., PAN/802.15), cellular (e.g., 3G, LTE/LTE-A/TD-LTE/TD-LTE, GSM, etc.), IrDA families, etc. As used herein, Wi-Fi may include one or more of IEEE-Std. 802.11, variants of IEEE-Std. 802.11, standards related to IEEE-Std. 802.11 (e.g., 802.11 a/b/g/n/ac/ad/af/ah/ai/aj/aq/ax/ay), and/or other wireless standards.

As used herein, processor, microprocessor, and/or digital processor may include any type of digital processing devices such as, without limitation, digital signal processors ("DSPs"), reduced instruction set computers ("RISC"), general-purpose ("CISC") processors, microprocessors, gate arrays (e.g., field programmable gate arrays ("FPGAs")), programmable logic device ("PLDs"), reconfigurable computer fabrics ("RCFs"), array processors, secure microprocessors, specialized processors (e.g., neuromorphic processors), and application-specific integrated circuits ("ASICs"). Such digital processors may be contained on a single unitary integrated circuit die or distributed across multiple components.

As used herein, computer program and/or software may include any sequence or human or machine cognizable steps which perform a function. Such computer program and/or software may be rendered in any programming language or environment including, for example, C/C++, C #, Fortran, COBOL, MATLAB™, PASCAL, GO, RUST, SCALA, Python, assembly language, markup languages (e.g., HTML, SGML, XML, VoXML), and the like, as well as object-oriented environments such as the Common Object Request Broker Architecture ("CORBA"), JAVA™ (including J2ME, Java Beans, etc.), Binary Runtime Environment (e.g., "BREW"), and the like.

As used herein, connection, link, and/or wireless link may include a causal link between any two or more entities (whether physical or logical/virtual), which enables information exchange between the entities.

As used herein, computer and/or computing device may include, but are not limited to, personal computers ("PCs") and minicomputers, whether desktop, laptop, or otherwise, mainframe computers, workstations, servers, personal digital assistants ("PDAs"), handheld computers, embedded computers, programmable logic devices, personal communicators, tablet computers, mobile devices, portable navigation aids, J2ME equipped devices, cellular telephones, smart phones, personal integrated communication or entertainment devices, and/or any other device capable of executing a set of instructions and processing an incoming data signal.

Detailed descriptions of the various embodiments of the system and methods of the disclosure are now provided. While many examples discussed herein may refer to specific exemplary embodiments, it will be appreciated that the described systems and methods contained herein are applicable to any kind of robot. Myriad other embodiments or uses for the technology described herein would be readily envisaged by those having ordinary skill in the art, given the contents of the present disclosure.

Advantageously, the systems and methods of this disclosure at least: (i) detect escalators within a surrounding environment using one or more sensors; (ii) improve the safety of operation of the robots; (iii) improve the ability for the robots to operate autonomously to avoid obstacles; and (iv) minimize risk of operating a robot in complex environments. Other advantages are readily discernable by one having ordinary skill in the art given the contents of the present disclosure.

According to at least one non-limiting exemplary embodiment, a robotic system is disclosed. The robotic system may comprise one or more distance measuring sensor configured to collect distance measurements of a floor in front of and nearby a robot to enable the robot to avoid sharp cliffs and obstacles. The robotic system may further comprise one or more specialized processors configured to execute computer readable instructions to determine an escalator based on data collected by the one or more distance measuring sensors.

According to at least one non-limiting exemplary embodiment, a robotic system may comprise a non-transitory computer readable storage medium comprising a plurality of instructions embodied thereon and one or more specialized processors configured to execute the computer readable instructions. The instructions may enable the one or more specialized processors to detect and avoid an escalator within an environment based on data collected by the distance measuring sensor using the systems and methods of the present disclosure.

According to at least one non-limiting exemplary embodiment, a method for a robot to detect an escalator is disclosed. The method may comprise a controller of the robot to detect two walls spaced apart by a predetermined width, the predetermined width corresponding to the width of an escalator. The method may further comprise detection of a small drop between a stationary floor and a first moving step of an escalator. Upon these two parameters being met, the controller of the robot may determine an escalator. According to at least one non-limiting exemplary embodiment, a robot, upon determining an escalator, may navigate the robot away from the escalator to avoid damage to the robot, damage to surrounding objects, or injuring nearby people if the robot were to fall down or navigate onto the escalator. According to another non-limiting exemplary embodiment, a robot may navigate onto the escalator to allow the robot to transport itself within an environment.

FIG. 1A is a functional block diagram of a robot 102 in accordance with some principles of this disclosure. As illustrated in FIG. 1A, robot 102 may include controller 118, memory 120, user interface unit 112, sensor units 114, navigation units 106, actuator unit 108, and communications unit 116, as well as other components and subcomponents (e.g., some of which may not be illustrated). Although a specific embodiment is illustrated in FIG. 1A, it is appreciated that the architecture may be varied in certain embodiments as would be readily apparent to one of ordinary skill given the contents of the present disclosure. As used herein, robot 102 may be representative at least in part of any robot described in this disclosure.

Controller 118 may control the various operations performed by robot 102. Controller 118 may include and/or comprise one or more processors (e.g., microprocessors) and other peripherals. As previously mentioned and used herein, processor, microprocessor, and/or digital processor may include any type of digital processing device such as, without limitation, digital signal processors ("DSPs"), reduced instruction set computers ("RISC"), general-purpose ("CISC") processors, microprocessors, gate arrays (e.g., field programmable gate arrays ("FPGAs")), programmable logic device ("PLDs"), reconfigurable computer fabrics ("RCFs"), array processors, secure microprocessors, specialized processors (e.g., neuromorphic processors), and application-specific integrated circuits ("ASICs"). Such digital processors may be contained on a single unitary integrated circuit die, or distributed across multiple components.

Controller 118 may be operatively and/or communicatively coupled to memory 120. Memory 120 may include any type of integrated circuit or other storage device configured to store digital data including, without limitation, read-only memory ("ROM"), random access memory ("RAM"), non-volatile random access memory ("NVRAM"), programmable read-only memory ("PROM"), electrically erasable programmable read-only memory ("EEPROM"), dynamic random-access memory ("DRAM"), Mobile DRAM, synchronous DRAM ("SDRAM"), double data rate SDRAM ("DDR/2 SDRAM"), extended data output ("EDO") RAM, fast page mode RAM ("FPM"), reduced latency DRAM ("RLDRAM"), static RAM ("SRAM"), flash memory (e.g., NAND/NOR), memristor memory, pseudostatic RAM ("PSRAM"), etc. Memory 120 may provide instructions and data to controller 118. For example, memory 120 may be a non-transitory, computer-readable storage apparatus and/or medium having a plurality of instructions stored thereon, the instructions being executable by a processing apparatus (e.g., controller 118) to operate robot 102. In some cases, the instructions may be configured to, when executed by the processing apparatus, cause the processing apparatus to perform the various methods, features, and/or functionality described in this disclosure. Accordingly, controller 118 may perform logical and/or arithmetic operations based on program instructions stored within memory 120. In some cases, the instructions and/or data of memory 120 may be stored in a combination of hardware, some located locally within robot 102, and some located remotely from robot 102 (e.g., in a cloud, server, network, etc.).

It is appreciated by one skilled in the art that the exemplary data table of the memory 120 may be a self-referential data table wherein additional rows and/or columns may be added as controller 118 executes computer readable instructions from memory 120.

It should be readily apparent to one of ordinary skill in the art that a processor may be external to robot 102 and be communicatively coupled to controller 118 of robot 102 utilizing communication units 116 wherein the external processor may receive data from robot 102, process the data, and transmit computer-readable instructions back to controller 118. In at least one non-limiting exemplary embodiment, the processor may be on a remote server (not shown).

In some exemplary embodiments, memory 120, shown in FIG. 1A, may store a library of sensor data. In some cases, the sensor data may be associated at least in part with objects and/or people. In exemplary embodiments, this library may include sensor data related to objects and/or people in different conditions, such as sensor data related to objects and/or people with different compositions (e.g., materials, reflective properties, molecular makeup, etc.), different lighting conditions, angles, sizes, distances, clarity (e.g., blurred, obstructed/occluded, partially off frame, etc.), colors, surroundings, and/or other conditions. The sensor data in the library may be taken by a sensor (e.g., a sensor of sensor units 114 or any other sensor) and/or generated automatically, such as with a computer program that is configured to generate/simulate (e.g., in a virtual world) library sensor data (e.g., which may generate/simulate these library data entirely digitally and/or beginning from actual sensor data) from different lighting conditions, angles, sizes, distances, clarity (e.g., blurred, obstructed/occluded, partially off frame, etc.), colors, surroundings, and/or other conditions. The number of images in the library may depend at least in part on one or more of the amount of available data, the variability of the surrounding environment in which robot 102 operates, the complexity of objects and/or people, the variability in appearance of objects, physical properties of robots, the characteristics of the sensors, and/or the amount of available storage space (e.g., in the library, memory 120, and/or local or remote storage). In exemplary embodiments, at least a portion of the library may be stored on a network (e.g., cloud, server, distributed network, etc.) and/or may not be stored completely within memory 120. As yet another exemplary embodiment, various robots (e.g., that are commonly associated, such as robots by a common manufacturer, user, network, etc.) may be networked so that data captured by individual robots are collectively shared with other robots. In such a fashion, these robots may be configured to learn and/or share sensor data in order to facilitate the ability to readily detect and/or identify errors and/or assist events.

Still referring to FIG. 1A, operative units 104 may be coupled to controller 118, or any other controller, to perform the various operations described in this disclosure. One, more, or none of the modules in operative units 104 may be included in some embodiments. Throughout this disclosure, reference may be to various controllers and/or processors. In some embodiments, a single controller (e.g., controller 118) may serve as the various controllers and/or processors described. In other embodiments different controllers and/or processors may be used, such as controllers and/or processors used particularly for one or more operative units 104. Controller 118 may send and/or receive signals, such as power signals, status signals, data signals, electrical signals, and/or any other desirable signals, including discrete and analog signals to operative units 104. Controller 118 may coordinate and/or manage operative units 104, and/or set timings (e.g., synchronously or asynchronously), turn off/on control power budgets, receive/send network instructions and/or updates, update firmware, send interrogatory signals, receive and/or send statuses, and/or perform any operations for running features of robot 102.

Returning to FIG. 1A, operative units 104 may include various units that perform functions for robot 102. For example, operative units 104 include at least navigation units 106, actuator units 108, user interface units 112, sensor units 114, and communication units 116. Operative units 104 may also comprise other units that provide the various functionality of robot 102. In exemplary embodiments, operative units 104 may be instantiated in software, hardware, or both software and hardware. For example, in some cases, units of operative units 104 may comprise computer implemented instructions executed by a controller. In exemplary embodiments, units of operative unit 104 may comprise hardcoded logic. In exemplary embodiments, units of operative units 104 may comprise both computer-implemented instructions executed by a controller and hardcoded logic. Where operative units 104 are implemented in part in software, operative units 104 may include units/modules of code configured to provide one or more functionalities.

In exemplary embodiments, navigation units 106 may include systems and methods that may computationally construct and update a map of an environment, localize robot 102 (e.g., find the position) in a map, and navigate robot 102 to/from destinations. The mapping may be performed by imposing data obtained in part by sensor units 114 into a computer-readable map representative at least in part of the environment. In exemplary embodiments, a map of an environment may be uploaded to robot 102 through user interface units 112, uploaded wirelessly or through wired connection, or taught to robot 102 by a user.

In exemplary embodiments, navigation units 106 may include components and/or software configured to provide directional instructions for robot 102 to navigate. Navigation units 106 may process maps, routes, and localization information generated by mapping and localization units, data from sensor units 114, and/or other operative units 104.

Still referring to FIG. 1A, actuator units 108 may include actuators such as electric motors, gas motors, driven magnet systems, solenoid/ratchet systems, piezoelectric systems (e.g., inchworm motors), magnetostrictive elements, gesticulation, and/or any way of driving an actuator known in the art. By way of illustration, such actuators may actuate the wheels for robot 102 to navigate a route; navigate around obstacles; rotate cameras and sensors.

Actuator unit 108 may include any system used for actuating, in some cases to perform tasks. For example, actuator unit 108 may include driven magnet systems, motors/engines (e.g., electric motors, combustion engines, steam engines, and/or any type of motor/engine known in the art), solenoid/ratchet system, piezoelectric system (e.g., an inchworm motor), magnetostrictive elements, gesticulation, and/or any actuator known in the art. According to exemplary embodiments, actuator unit 108 may include systems that allow movement of robot 102, such as motorized propulsion. For example, motorized propulsion may move robot 102 in a forward or backward direction, and/or be used at least in part in turning robot 102 (e.g., left, right, and/or any other direction). By way of illustration, actuator unit 108 may control if robot 102 is moving or is stopped and/or allow robot 102 to navigate from one location to another location.

According to exemplary embodiments, sensor units 114 may comprise systems and/or methods that may detect characteristics within and/or around robot 102. Sensor units 114 may comprise a plurality and/or a combination of sensors. Sensor units 114 may include sensors that are internal to robot 102 or external, and/or have components that are partially internal and/or partially external. In some cases, sensor units 114 may include one or more exteroceptive sensors, such as sonars, light detection and ranging ("LiDAR") sensors, radars, lasers, cameras (including video cameras (e.g., red-blue-green ("RBG") cameras, infrared cameras, three-dimensional ("3D") cameras, thermal cameras, etc.), time of flight ("TOF") cameras, structured light cameras, antennas, motion detectors, microphones, and/or any other sensor known in the art. According to some exemplary embodiments, sensor units 114 may collect raw measurements (e.g., currents, voltages, resistances, gate logic, etc.) and/or transformed measurements (e.g., distances, angles, detected points in obstacles, etc.). In some cases, measurements may be aggregated and/or summarized. Sensor units 114 may generate data based at least in part on distance or height measurements. Such data may be stored in data structures, such as matrices, arrays, queues, lists, arrays, stacks, bags, etc.

According to exemplary embodiments, sensor units 114 may include sensors that may measure internal characteristics of robot 102. For example, sensor units 114 may measure temperature, power levels, statuses, and/or any characteristics of robot 102. In some cases, sensor units 114 may be configured to determine the odometry of robot 102. For example, sensor units 114 may include proprioceptive sensors, which may comprise sensors such as accelerometers, inertial measurement units ("IMU"), odometers, gyroscopes, speedometers, cameras (e.g. using visual odometry), clock/timer, and the like. Odometry may facilitate autonomous navigation and/or autonomous actions of robot 102. This odometry may include robot 102's position (e.g., where position may include robot's location, displacement and/or orientation, and may sometimes be interchangeable with the term pose as used herein) relative to the initial location. Such data may be stored in data structures, such as matrices, arrays, queues, lists, arrays, stacks, bags, etc. According to exemplary embodiments, the data structure of the sensor data may be called an image.

According to exemplary embodiments, user interface units 112 may be configured to enable a user to interact with robot 102. For example, user interface units 112 may include touch panels, buttons, keypads/keyboards, ports (e.g., universal serial bus ("USB"), digital visual interface ("DVI"), Display Port, E-Sata, Firewire, PS/2, Serial, VGA, SCSI, audioport, high-definition multimedia interface ("HDMI"), personal computer memory card international association ("PCMCIA") ports, memory card ports (e.g., secure digital ("SD") and miniSD), and/or ports for computer-readable medium), mice, rollerballs, consoles, vibrators, audio transducers, and/or any interface for a user to input and/or receive data and/or commands, whether coupled wirelessly or through wires. Users may interact through voice commands or gestures. User interface units 218 may include a display, such as, without limitation, liquid crystal display ("LCDs"), light-emitting diode ("LED") displays, LED LCD displays, in-plane-switching ("IPS") displays, cathode ray tubes, plasma displays, high definition ("HD") panels, 4K displays, retina displays, organic LED displays, touchscreens, surfaces, canvases, and/or any displays, televisions, monitors, panels, and/or devices known in the art for visual presentation. According to exemplary embodiments, user interface units 112 may be positioned on the body of robot 102. According to exemplary embodiments, user interface units 112 may be positioned away from the body of robot 102 but may be communicatively coupled to robot 102 (e.g., via communication units including transmitters, receivers, and/or transceivers) directly or indirectly (e.g., through a network, server, and/or a cloud). According to exemplary embodiments, user interface units 112 may include one or more projections of images on a surface (e.g., the floor) proximally located to the robot, e.g., to provide information to the occupant or to people around the robot. The information could be the direction of future movement of the robot, such as an indication of moving forward, left, right, back, at an angle, and/or any other direction. In some cases, such information may utilize arrows, colors, symbols, etc.

According to exemplary embodiments, communications unit 116 may include one or more receivers, transmitters, and/or transceivers. Communications unit 116 may be configured to send/receive a transmission protocol, such as BLUETOOTH®, ZIGBEE®, Wi-Fi, induction wireless data transmission, radio frequencies, radio transmission, radio-frequency identification ("RFID"), near-field communication ("NFC"), infrared, network interfaces, cellular technologies such as 3G (3GPP/3GPP2), high-speed downlink packet access ("HSDPA"), high-speed uplink packet access ("HSUPA"), time division multiple access ("TDMA"), code division multiple access ("CDMA") (e.g., IS-95A, wideband code division multiple access ("WCDMA"), etc.), frequency hopping spread spectrum ("FHSS"), direct sequence spread spectrum ("DSSS"), global system for mobile communication ("GSM"), Personal Area Network ("PAN") (e.g., PAN/ 802.15), worldwide interoperability for microwave access ("WiMAX"), 802.20, long term evolution ("LTE") (e.g., LTE/LTE-A), time division LTE ("TD-LTE"), global system for mobile communication ("GSM"), narrowband/frequency-division multiple access ("FDMA"), orthogonal frequency-division multiplexing ("OFDM"), analog cellular, cellular digital packet data ("CDPD"), satellite systems, millimeter wave or microwave systems, acoustic, infrared (e.g., infrared data association ("IrDA")), and/or any other form of wireless data transmission.

Communications unit 116 may also be configured to send/receive signals utilizing a transmission protocol over wired connections, such as any cable that has a signal line and ground. For example, such cables may include Ethernet cables, coaxial cables, Universal Serial Bus ("USB"), Fire-Wire, and/or any connection known in the art. Such protocols may be used by communications unit 116 to communicate to external systems, such as computers, smart phones, tablets, data capture systems, mobile telecommunications networks, clouds, servers, or the like. Communications unit 116 may be configured to send and receive signals comprising of numbers, letters, alphanumeric characters, and/or symbols. In some cases, signals may be encrypted, using algorithms such as 128-bit or 256-bit keys and/or other encryption algorithms complying with standards such as the Advanced Encryption Standard ("AES"), RSA, Data Encryption Standard ("DES"), Triple DES, and the like. Communications unit 116 may be configured to send and receive statuses, commands, and other data/information. For example, communications unit 116 may communicate with a user operator to allow the user to control robot 102. Communications unit 116 may communicate with a server/ network (e.g., a network) in order to allow robot 102 to send data, statuses, commands, and other communications to the server. The server may also be communicatively coupled to computer(s) and/or device(s) that may be used to monitor and/or control robot 102 remotely. Communications unit 116 may also receive updates (e.g., firmware or data updates), data, statuses, commands, and other communications from a server for robot 102.

In exemplary embodiments, operating system 110 may be configured to manage memory 120, controller 118, power supply 122, modules in operative units 104, and/or any software, hardware, and/or features of robot 102. For example, and without limitation, operating system 110 may include device drivers to manage hardware recourses for robot 102.

In exemplary embodiments, power supply 122 may include one or more batteries, including, without limitation, lithium, lithium ion, nickel-cadmium, nickel-metal hydride, nickel-hydrogen, carbon-zinc, silver-oxide, zinc-carbon, zinc-air, mercury oxide, alkaline, or any other type of battery known in the art. Certain batteries may be rechargeable, such as wirelessly (e.g., by resonant circuit and/or a resonant tank circuit) and/or plugging into an external power source. Power supply 122 may also be any supplier of energy, including wall sockets and electronic devices that convert solar, wind, water, nuclear, hydrogen, gasoline, natural gas, fossil fuels, mechanical energy, steam, and/or any power source into electricity.

One or more of the units described with respect to FIG. 1A (including memory 120, controller 118, sensor units 114, user interface unit 112, actuator unit 108, communications unit 116, mapping and localization unit 126, and/or other units) may be integrated onto robot 102, such as in an integrated system. However, according to some exemplary embodiments, one or more of these units may be part of an attachable module. This module may be attached to an existing apparatus to automate so that it behaves as a robot. Accordingly, the features described in this disclosure with reference to robot 102 may be instantiated in a module that may be attached to an existing apparatus and/or integrated onto robot 102 in an integrated system. Moreover, in some cases, a person having ordinary skill in the art would appreciate from the contents of this disclosure that at least a portion of the features described in this disclosure may also be run remotely, such as in a cloud, network, and/or server.

As used here on out, a robot 102, a controller 118, or any other controller, processor, or robot performing a task illustrated in the figures below comprises a controller executing computer readable instructions stored on a non-transitory computer readable storage apparatus, such as memory 120, as would be appreciated by one skilled in the art.

Figure 1B:
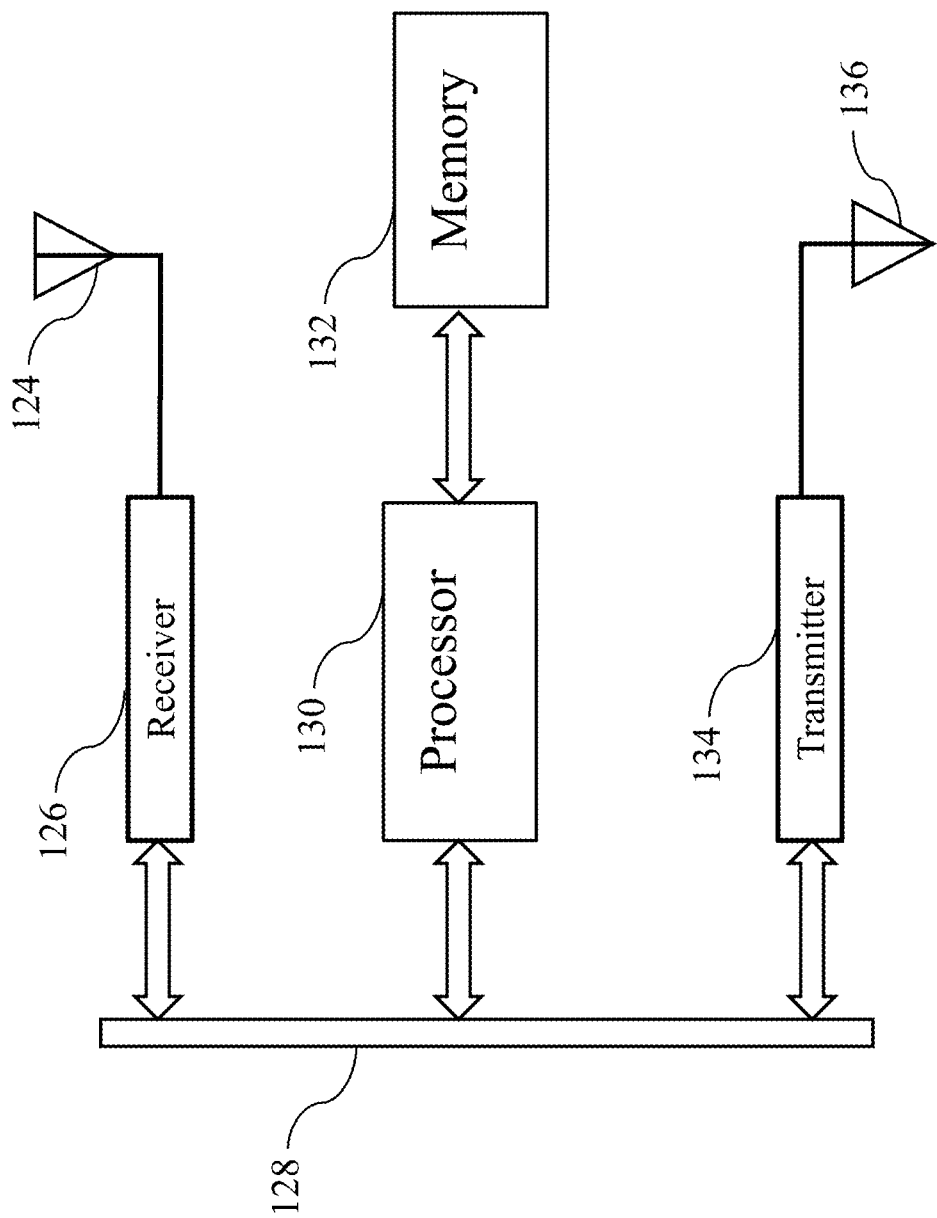
FIG. 1B is a functional block diagram of a controller or processor in accordance with some embodiments of this disclosure.

Next referring to FIG. 1B, the architecture of the specialized controller 118 used in the system shown in FIG. 1A is illustrated according to an exemplary embodiment. As illustrated in FIG. 1B, the specialized computer includes a data bus 128, a receiver 126, a transmitter 134, at least one processor 130, and a memory 132. The receiver 126, the processor 130 and the transmitter 134 all communicate with each other via the data bus 128. The processor 130 is a specialized processor configured to execute specialized algorithms. The processor 130 is configured to access the memory 132 which stores computer code or instructions in order for the processor 130 to execute the specialized algorithms. As illustrated in FIG. 1B, memory 132 may comprise some, none, different, or all of the features of memory 124 previously illustrated in FIG. 1A. The algorithms executed by the processor 130 are discussed in further detail below. The receiver 126 as shown in FIG. 1B is configured to receive input signals 124. The input signals 124 may comprise signals from a plurality of operative units 104 illustrated in FIG. 1A including, but not limited to, sensor data from sensor units 114, user inputs, motor feedback, external communication signals (e.g., from a remote server), and/or any other signal from an operative unit 104 requiring further processing by the specialized controller 118. The receiver 126 communicates these received signals to the processor 130 via the data bus 128. As one skilled in the art would appreciate, the data bus 128 is the means of communication between the different components—receiver, processor, and transmitter—in the specialized controller 118. The processor 130 executes the algorithms, as discussed below, by accessing specialized computer-readable instructions from the memory 132. Further detailed description as to the processor 130 executing the specialized algorithms in receiving, processing and transmitting of these signals is discussed above with respect to FIG. 1A. The memory 132 is a storage medium for storing computer code or instructions. The storage medium may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage medium may include volatile, nonvolatile, dynamic, static, read/write, read-only, random-access, sequential-access, location-addressable, file-addressable, and/or content-addressable devices. The processor 130 may communicate output signals to transmitter 134 via data bus 128 as illustrated. The transmitter 134 may be configured to further communicate the output signals to a plurality of operative units 104 illustrated by signal output 136.

One of ordinary skill in the art would appreciate that the architecture illustrated in FIG. 1B may illustrate an external server architecture configured to effectuate the control of a robotic apparatus from a remote location. That is, the server may also include a data bus, a receiver, a transmitter, a processor, and a memory that stores specialized computer readable instructions thereon.

Figure 2B:
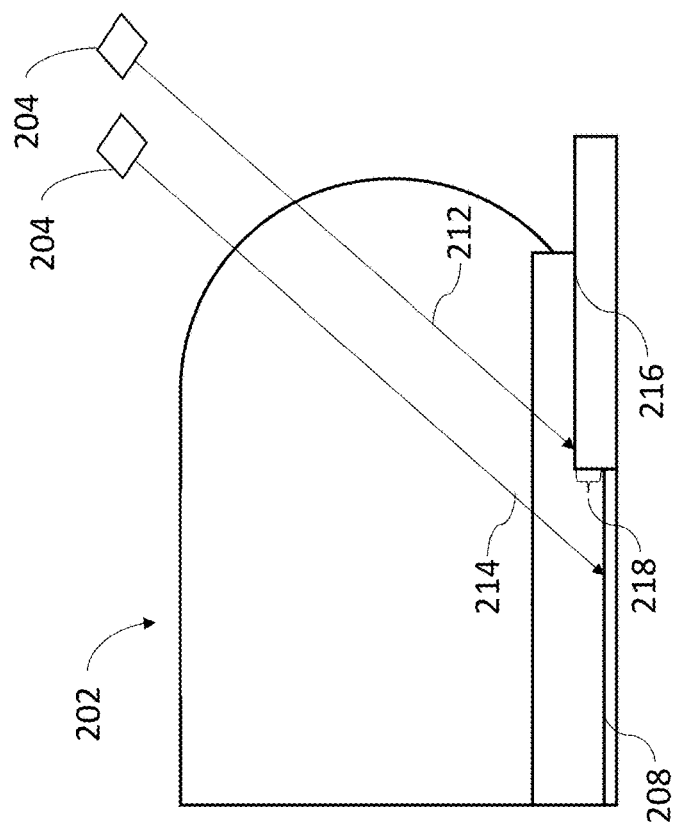
FIG. 2B illustrates a side view of an escalator and a distance measuring sensor collecting measurements to determine a drop between a first moving step and a stationary portion of the escalator, according to an exemplary embodiment.
Figure 2A:
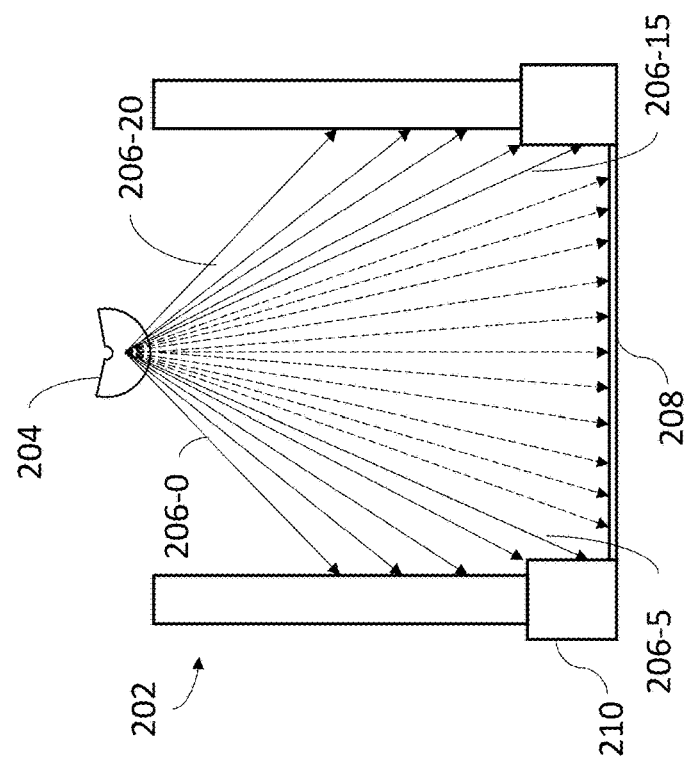
FIG. 2A illustrates a front view of an escalator and a distance measuring sensor collecting data comprising height measurements at various points of the escalator, according to an exemplary embodiment.

FIG. 2A illustrates a front view of one or more sensors 204 collecting a plurality of distance measurements 206 of an escalator 202 according to an exemplary embodiment. As discussed above, use of escalator is for purposes of an example only and not limiting for purposes of this disclosure. One skilled in the art may appreciate that the underlying concepts are directed to detecting drops in a plane traveled by a robot 102, and an effort to detect and avoid such drops. The sensor 204 may comprise a distance measuring sensor such as, for example, a LiDAR sensor configured to measure a distance between the sensor 204 and a target, such as a floor 208. The sensor 204 may be positioned on a chassis of a robot 102 (not shown). The floor 208 may comprise the first moving step of the escalator 202. As illustrated, the one or more distance measuring sensors 204 may collect twenty (20) distance measurements 206 (i.e., 206-0 to 206-20) separated by known angular distances. According to other non-limiting exemplary embodiments, one or more distance measuring sensors 204 may collect additional or fewer measurements 206-$n$, wherein index "n" may be any positive integer number. According to at least one non-limiting exemplary embodiment, the angular measurement range (e.g., the angular range between measurement 206-0 and 206-20 as illustrated) of sensor 204 may comprise a greater or smaller angular measurement range than as illustrated in FIG. 2A. For example, a short robot or a robot with a sensor 204 close to the floor 208 may make measurements between the two balustrades 210 as the sensor 204 may not be high enough from the floor 208 to measure the walls or railings of the escalator 202. The plurality of distance measurements 206 may be stored in a memory 120 of the robot 102 by a controller 118, as illustrated in FIG. 1A, for later determination of the escalator by controller 118 based on the plurality of distance measurements 206.

FIG. 2B illustrates side view of one or more sensors 204, as illustrated previously in FIG. 2A, collecting distance measurements 212 and 214 of an escalator 202 at two locations, according to an exemplary embodiment. One skilled in the art may appreciate that one or more sensors 204 may correspond to a first sensor and a different sensor as illustrated in FIG. 2B. Alternatively, the one or more sensors correspond to a single sensor. The sensors 204 may make measurement 212 at the position near the escalator 202 as illustrated or at any location on a flat floor of which a robot 102 (not shown) comprising the sensor 204 is upon. In other words, measurement 212 taken from the sensor 204 to the stationary portion 216 (i.e., the first region) provides a reference distance measurement to determine a reference height of zero (0) measurement units (e.g., centimeters, inches, etc.), as illustrated below with respect to FIG. 3A. The sensor 204 may additionally receive another measurement 214 as the robot 102 (not shown) comprising the sensor 204, and mounted thereon, moves towards the escalator 202 (i.e., as the robot 102 moves leftwards in the illustration). The distance measurement 214 may correspond to a side view of the measurements 206, as illustrated above in FIG. 2A, measuring the distance between the sensor 204 and the floor 208 comprising of the first moving step of the escalator 202 or a second reference point or second region that is different from the first region or the stationary portion 216. Upon a controller 118 of the robot 102 (not shown) receiving measurement 214, which differs from the reference measurement 212, controller 118 may determine the magnitude of drop 218 to be used to determine a drop parameter, as will be illustrated further with respect to FIG. 5. The drop parameter may be used to determine an escalator detection parameter, indicative of detection of the escalator 202 by the sensor 204.

According to at least one non-limiting exemplary embodiment, a distance measuring sensor 204 may be configured to collect measurements 212 and 214 at the same time and/or at the same position. For example, an array of distance measuring cameras or LIDAR sensors may be implemented to collect distance measurements in two-dimensional (2D) or three-dimensional (3D) space. The magnitude of drop 218 may be used to satisfy or meet a threshold of a drop parameter used to determine an escalator from the measurements 206, 212, and 214 as discussed in FIG. 5. In other words, if the drop exceeds the drop parameter that indicates to the controller 118 that proceeding forward along this path would result in robot 102 experiencing a fall that would result in harm to the robot 102 as it may fall or tip over.

Figure 3A:
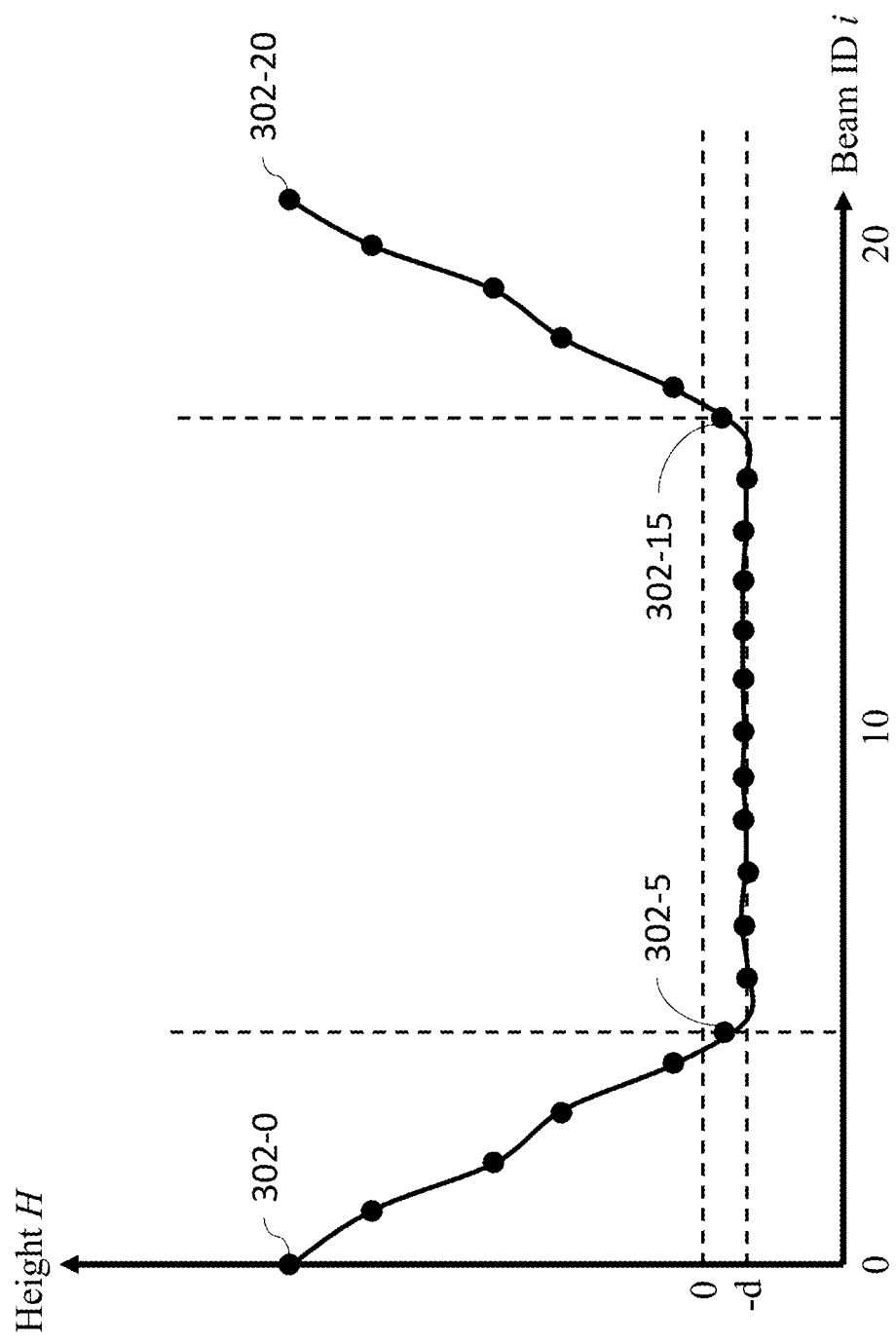
FIG. 3A illustrates height measurements taken by the distance measuring sensor collecting data comprising height measurements at various points of an escalator, according to an exemplary embodiment.

FIG. 3A illustrates a height measurement "H" from the one or more distance measuring sensors 204 illustrated above in FIG. 2A-B, according to an exemplary embodiment. The horizontal axis may comprise beam ID indices "i" corresponding to the individual distance measurements 206 illustrated above in FIG. 2A, wherein a height measurement 302 corresponds to a magnitude of a distance measurement 206 with the same index i (e.g., height measurement 302-5 corresponds to distance measurement 206-5, etc.). The vertical axis corresponds to a height measurement for each of the beam ID indices corresponding to a measurement 206 with the same index, wherein a height of zero corresponds to the reference distance 212 comprising of a distance between the sensor 204 and a stationary portion 216 of the escalator of which the robot 102 is navigating upon. The points between 302-5 and 302-15, not inclusive, may correspond height measurements of the floor 208 or a different, second region on the floor. The mean height value of the points 302-5 to 302-15, not inclusive, may be determined to be −d wherein the magnitude, |d|, corresponds to the magnitude of the drop 218, previously illustrated in FIG. 2B, between the stationary portion 216 of an escalator 202 and the first moving step 208. The magnitude, |d|, may be communicated to a robot 102 via a user interface unit 112, from an external server via communications units 116 of the robot 102, or through a learning process (e.g., determined based on a measured average) based on data received by controller 118 by the one or more sensors 204. Recall the robot 102 comprising the one or more distance measuring sensors 204 generating the data illustrated is navigating or resting on the stationary portion 216 of an escalator 202 at a height d above the first moving step 208. The value d may be used to determine a drop parameter to be further utilized to determine an escalator detection parameter as illustrated below in FIG. 5.

According to at least one non-limiting exemplary embodiment, a sensor may not be perfectly calibrated and may perceive a floor of which a robot 102 is located or traveling upon to be at a non-zero height. Accordingly, the value of "d" may be changed or updated in real-time to account for this calibration error. For example, a sensor of a robot may detect a floor of which the robot is upon to be at a height of one centimeter (1 cm) from a reference height of zero (0) recorded by a perfectly calibrated sensor, wherein the prescribed value of "−d" may be increased by one centimeter (1 cm) to account for this calibration error. In other words, the magnitude of "d" corresponds to the magnitude of drop 218, illustrated in FIG. 2B, and may be taken from any reference height, wherein the reference height of zero (0) as illustrated in FIG. 3A is illustrative of a perfectly calibrated sensor according to an exemplary embodiment. This drop 218 is always present between the stationary floor 218 and first moving step 208 of the escalator and typically comprises a small value of 10-30 millimeters.

One skilled in the art would appreciate that the horizontal axis as illustrated may comprise a different measurement such as, for example, an angular measurement centered about zero degrees (0°). Additionally, according to at least one non-limiting exemplary embodiment, the height measurements may be replaced with distance measurements wherein one would expect to see a substantially similar, inverted graph to the one illustrated in FIG. 3B.

Figure 3B:
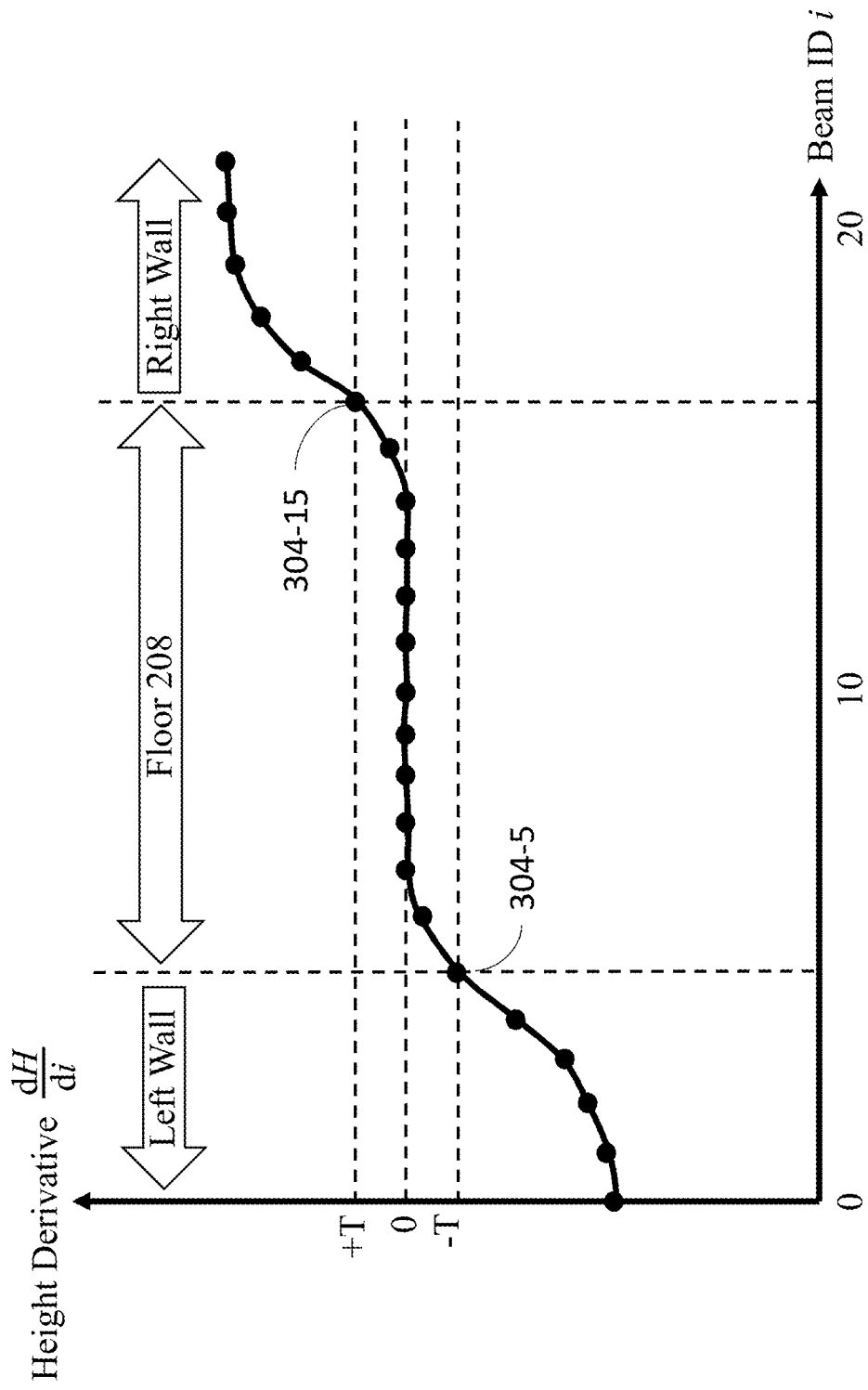
FIG. 3B illustrates a derivative of the height measurements illustrated in FIG. 3A, according to an exemplary embodiment.

FIG. 3B illustrates the derivative of the height measurement "H" with respect to beam ID "i" graph previously illustrated in FIG. 3A, according to an exemplary embodiment. Each derivative measurement 304 may correspond to a height measurement 302, as illustrated in FIG. 3A, comprising the same index "n" (e.g., height measurement 302-3 corresponds to derivative measurement 304-3). The left balustrade 210 of the escalator 202, previously illustrated in FIG. 2A, may be determined by a controller 118 to be measured by a beam ID corresponding to the derivative measurement 304-5 meeting the negative wall threshold parameter of value "−T" (e.g., beam 5 or notation 302-5 shown in FIG. 3A). Similarly, the right balustrade 210 of the escalator 202 may be determined by a controller 118 to be measured by a beam ID corresponding to the derivative measurement 304-15 meeting a positive wall threshold parameter value "+T" (e.g., beam 15 or notation 302-15 shown in FIG. 3B). The magnitude of the wall threshold parameter "T" may be communicated to a robot 102 via a user interface unit 112, from an external server communicating the magnitude of "T" via communications units 116, or through a learning process (e.g., based on identifying similarities in a plurality of LiDAR scans of escalators).

Points to the left of derivative measurement 304-5, inclusive, may then be determined to correspond to measurements along the left wall of the escalator 202 and points to the right of derivative measurement 304-15, inclusive, may then be determined to correspond to measurements along the right wall of escalator 202. Accordingly, the remaining points between derivative measurement 304-5 and 304-15, not inclusive, may correspond to floor 208 between the two balustrades 210 of escalator 202. According to at least one non-limiting exemplary embodiment, controller 118 may determine the points corresponding to floor 208 based on the derivative measurements 304 being of lesser magnitude than threshold "T" (e.g., derivative measurements 304-5 through 304-15, not inclusive). Controller 118 may then determine the width of the floor based on the number of beam IDs corresponding to floor 208 to be used in determining a wall spacing parameter as illustrated below in FIG. 5.

According to at least one non-limiting exemplary embodiment, the graph illustrated in FIG. 3A may comprise no measurements between points 302-1 and 302-5 and/or between points 302-15 and 302-20 as side walls, or balustrades 210, of an escalator, which may be comprised of glass or other material transparent to the LiDAR sensor. In many instances, the handrails may still be detected (i.e., points 302-0 and 302-20 are present). Accordingly, the graph illustrated in FIG. 3B may comprise no derivative measurements 304 for these respective points due to the discontinuity. It may be appreciated, however, that the side balustrades 210 are metallic or opaque materials and may still be detected by a LiDAR sensor. Accordingly, in environments comprising escalators with glass side walls, only one or more derivative measurements 304 exceeding the threshold magnitude "T" may be required to satisfy the derivative threshold, corresponding to a detection of the side balustrades 210. Detection of the floor 208 at a distance "−d" below the floor upon which robot 102 navigates or rests upon is still required to detect escalators in these embodiments. One skilled in art will appreciate that if the side walls are made of glass, it would not be with points 302. However, balustrades 210 will be picked up as they are usually metallic or opaque in nature; and in-turn will satisfy the derivative threshold.

According to at least one non-limiting exemplary embodiment, the vertical axis may correspond to a derivative of a distance measurement with respect to beam ID i or angle at which the beams 206 are emitted from the sensor 204, wherein the threshold corresponding to a right wall detection may be of negative wall threshold value "−T" and vice versa for the left wall FIG. 4 illustrates a data table illustrating a structure for storing points corresponding to a plurality of distance measurements 206 taken by a distance measuring sensor 204 of an escalator 202, as illustrated in FIG. 2A, according to an exemplary embodiment. Upon determining a set of distance measurements 206 to correspond to a left wall and right wall of an escalator, using methods illustrated in FIG. 3A-B, a controller 118 of a robot 102 may store the beam IDs corresponding to the distance measurements 206 in an appropriate buffer. Each buffer may comprise one or more beam ID numbers (e.g., index "i" in the graphs illustrated in FIG. 3A-B) and one or more corresponding height values $H_n$, wherein index "n" may be any positive integer number, including zero, corresponding to distance measurements 206 measured by a beam ID number of the same index. As previously illustrated in FIG. 3B, the beam with an ID number five (5), corresponding to derivative measurement 304-5 meeting the left wall threshold "−T", may therefore be determined as the maximum beam ID number corresponding to the left wall of the escalator 202. Similarly, the beam with an ID number fifteen (15), corresponding to the derivative measurement 304-15 meeting the right wall threshold "+T", may therefore be determined as the minimum beam ID number corresponding to the right wall of the escalator 202.

Additionally, the remaining beam IDs between beam ID numbers six through fourteen inclusive, may correspond measurements 206 taken of floor 208, as illustrated in FIG. 2A, and may therefore be stored in a floor points buffer. Controller 118 may calculate the width of the floor between the left and right walls based on the number of beams between the walls and known parameters of the sensor such as the angle of the sensor, angle of each beam, and the distance measurement 206 received or determined by the distance measuring sensor 204. The width of the floor between the left and right walls may be used to determine a wall parameter used to determine an escalator detection parameter as illustrated below in FIG. 5.

Controller 118 of robot 102 may then determine a mean value of the height values stored within the floor points buffer (e.g., $H_6$-$H_{14}$). The mean height value may be compared to the value of "d" to determine if the floor points correspond to a measurement of floor 208, the first moving step of escalator 202 depreciated by a value of "d" with respect to the stationary floor. If the mean height value is equal to the value of "d" within a prescribed small margin of error (e.g., within 0.5 centimeters or less due to random thermal noise), controller 118 may determine a drop parameter, used to determine an escalator detection parameter, is met as illustrated below in FIG. 5.

One skilled in the art would appreciate that data table shown in FIG. 4 may be a self-referential table that may have additional rows and columns added to it as controller 118 executes computer readable instructions or receives additional measurements from a distance measuring sensor 204.

In some instances, escalators 202 may comprise of glass sidewalls. Accordingly, the left and right wall buffers may be empty, aside from a few measurements 302, which sense the side balustrades 210 of the escalator 202. The measurements 302 of the side balustrades 210 may still satisfy the derivative threshold shown in FIG. 3B above.

FIG. 5 illustrates a process flow diagram illustrating a method 500 for a controller 118 of a robot 102 to determine an escalator detection parameter based on sensor data measured by a distance measuring sensor of sensor units 114, according to an exemplary embodiment. The escalator detection parameter being met may indicate the sensor data corresponds to measurements, which sense, at least in part, an escalator.

Block 502 illustrates controller 118 collecting sensor data from one or more distance measuring sensor 204. Data from the one or more distance measuring sensors 204 may be stored in a memory 120 in a plurality of formats such as, including but not limited to, a matrix, an array, a buffer, and/or any other form of storing data. The distance measuring sensor data may comprise a plurality of height or distance measurements observed by the distance measuring sensor. The distance measuring sensor may collect data at discrete intervals in time or continuously in time.

Block 504 illustrates controller 118 calculating the derivative of the sensor data collected in block 502. The derivative may be taken with respect to a beam ID number, as illustrated in FIG. 3A-B; an angular distance; lateral distance; or other similar parameter. Controller 118 may then store the derivative of the sensor data in memory 120 in a plurality of formats substantially similar to the formats used to store the sensor data received in block 502.

Block 506 illustrates controller 118 determining if all sidewall thresholds are met. The sidewall thresholds may comprise of two sidewall detection parameters, corresponding to the detection of a left wall of the escalator 202, right wall of the escalator 202, and a spacing parameter, corresponding to a minimum separation requirement between the left and right walls. A side wall detection parameter may be met by at least one derivative measurement 304 meeting or exceeding a prescribed threshold, illustrated by the magnitude of "T" in FIG. 3B, indicative of detection of a side wall by the distance measuring sensor. At least one requirement may allow for detection of side balustrades 210 of an escalator 202 if the escalator 202 comprises glass side walls which are transparent to the sensor 204.

For example, a LiDAR scan produced by a robot 102 may indicate a left wall of an escalator 202 is detected when derivative measurements 304, and corresponding height measurements 302 of the same index, comprise value less than or equal to "−T" as shown in FIG. 3B above. Similarly, a right wall of an escalator may be determined to include derivative measurements 304, corresponding to height measurements 302 of the same index, of value greater than or equal to "+T", as illustrated in FIG. 4B. The derivative measurements 304 which exceed a magnitude of "T" may correspond to a positive detection of left or right walls of a narrow hallway, wherein the hallway may potentially be an escalator.

Figure 6B:
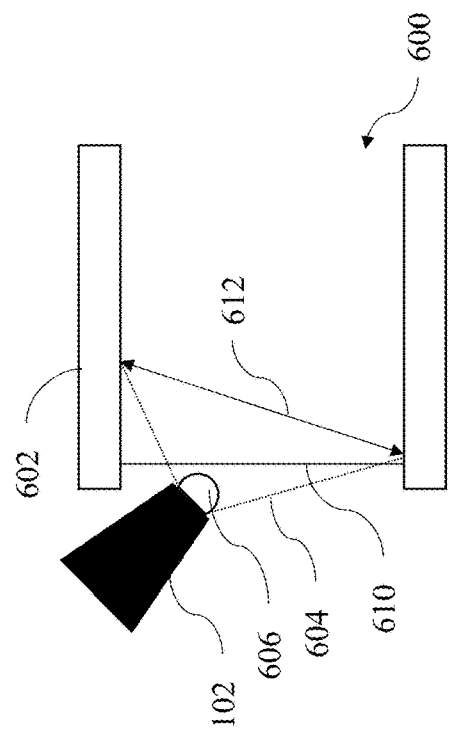
FIG. 6A-B illustrates a robot approaching an escalator at two angles of approach to illustrate how a minimum spacing parameter used for detecting the escalator is invariant of the angles of approach of the robot, according to an exemplary embodiment.
Figure 6A:
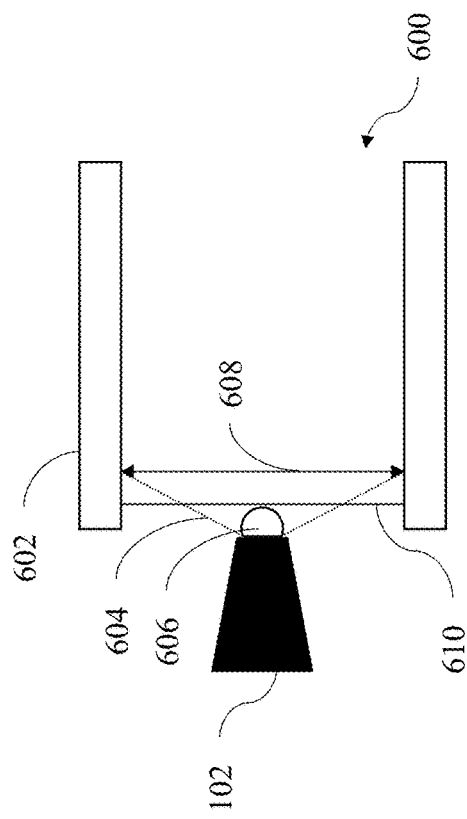

The sidewall thresholds may further include a spacing parameter, requiring both the detected left and right walls or balustrades 210 to be separated by a predetermined distance, the distance may correspond to the width of an escalator. Escalator widths are generally standardized to be approximately 24 inches, 32 inches, or 40 inches (equivalent to 61 centimeter, 82 centimeter, 102 centimeter), hence the spacing parameter is at least about 24 inches, but may be predefined to any length of escalator or moving walkway. The predetermined distance may be communicated to a robot 102 via a user interface unit 112, via communications unit 116 communicating with an external server or network, or via a learning process. The spacing of the two walls of the escalator may be determined based on a distance of the robot 102 to the side walls and angle of approach of the robot 102, as illustrated in FIG. 6A-B. Advantageously, the use of a spacing parameter of the two detected walls may eliminate a majority of unnecessary calculations by the controller 118 due to narrow passageways or other walls detected generating a false positive for escalator detection According to at least one non-limiting exemplary embodiment, predetermined widths of an escalator communicated to a robot 102 may comprise a minimum width requirement to account for robot 102 approaching an escalator at an angle not perfectly orthogonal to the entrance of the escalator, as illustrated below in FIG. 6A-B. According to at least one non-limiting exemplary embodiment, a plurality of escalators of varying width may be present within a surrounding environment of a robot 102, wherein robot 102 may receive multiple wall separation widths corresponding to the widths of the plurality of escalators. Controller 118, in this exemplary embodiment, may determine the separation parameter to be satisfied if the spacing of the determined left and right walls is of the same width as one of the plurality of escalator widths known to the robot 102.

According to at least one non-limiting exemplary embodiment, the side wall thresholds may further comprise a flatness threshold requiring the space between the two detected side walls to be substantially flat (i.e., comprise a derivative dH/di very close to zero). That is, with reference to FIG. 3A, the height measurements 302-6, 302-14, inclusive, may not deviate by a threshold amount to meet the flatness threshold. This may be further utilized to remove a false positive escalator detection.

Upon detecting both walls of the escalator 202 (i.e., right and left walls) and measuring the separation between the walls of the escalator to be at least a distance corresponding to the width of an escalator (e.g., all wall thresholds met), the controller 118 next moves on to block 508. However, if it is determined that one or more wall thresholds is not being met, then controller 118 returns back to block 502 and re-executes the algorithm.

Block 508 illustrates controller 118 storing the height measurements 302, corresponding to height measurements 302 of the detected left wall, right wall, and floor 208 of escalator 202, in appropriate buffers, as illustrated above in FIG. 4. According to some non-limiting exemplary embodiment, the measurements may be stored in a plurality of other formats such as, for example, an array, matrix, or other similar data format. Controller 118 may determine points corresponding to the left wall, right wall, and floor between the walls of the escalator 202 based the wall parameters illustrated in block 506. For example, height measurements corresponding to a left wall of an escalator may have corresponding derivative measurements below the wall detection threshold "−T" and may therefore be stored in a left wall buffer. Controller 118 may determine and store distance measurements corresponding to a right wall of the escalator in a substantially similar way. Controller 118 may further determine the points not within the left or right wall buffers to correspond to height measurements of a floor between the left and right walls and may store the remaining points in a floor buffer.

Block 510 illustrates controller 118 determining a mean height value of the floor measurements within the floor buffer. As previously illustrated in FIG. 4, each measurement within the floor buffer comprises a height measurement, wherein controller 118 may determine the mean value of the height measurements of all the points within the floor buffer.

Block 512 illustrates controller 118 determining if a drop parameter is met or satisfied. The drop parameter may be utilized to determine if a drop 218, illustrated above in FIG. 2, is present within a floor surrounded by two walls on the left and right side, indicative of an escalator, cliff or staircase. The mean height value of the floor measurements is compared to the drop parameter of magnitude "d", as illustrated in FIG. 3A, wherein the magnitude of "d" may correspond to the magnitude of the drop 218 between a stationary portion 216 of an escalator and a first moving step 208 that is moving away from the stationary portion 216 of the escalator. The magnitude of "d" may be communicated to a robot 102 via a user interface unit 112, communicated by a server or network via communications units 116, or learned through a learning process. The drop parameter is met, equivalent to, or exceeds, if the mean height of the floor, calculated in block 510, is of value "−d" within a small margin of error (e.g., 0.5 centimeters or less) with respect to a reference height of zero (0), corresponding to the height of a floor of which a robot 102 is upon.

According to at least one non-limiting exemplary embodiment, the reference height may not be zero (0), such as in the case of a not perfectly calibrated sensor. Accordingly, the drop parameter may be met if the mean floor height is of magnitude "d" less than the reference height of the floor measured by the not perfectly calibrated sensor. Upon the drop parameter being met, controller 118 moves to block 514. However, upon the drop parameter not being met, the controller 118 moves back to block 502 and re-executes the algorithm.

Block 514 illustrates controller 118 determining the escalator detection parameter being met based on the side wall parameters and the drop parameter being met, indicative of an escalator being detected by the distance measuring sensor. According to at least one non-limiting exemplary embodiment, a controller 118 may reroute a robot 102 away from the escalator upon the escalator detection parameter being met. According to another non-limiting exemplary embodiment, a controller 118 may navigate a robot 102 onto a determined escalator to transport the robot 102. One skilled in the art may appreciate that the drop parameter may be a pre-programmed value that takes into account the physical characteristics (i.e., height, width, breadth) of the robot 102 traveling a trajectory. As such, a smaller or shorter robot may have a different drop parameter than a larger or bigger robot.

FIG. 6A illustrates a top view of a robot 102 approaching an escalator 600 at an angle orthogonal to an entrance of escalator 600, according to an exemplary embodiment. Escalator 600 may comprise a drop 610, corresponding to a drop between a stationary portion of escalator 600 and a first moving step (e.g., a top view of drop 218 illustrated above in FIG. 2B). Robot 102 may navigate towards escalator 600 collecting distance measurements from a planar LiDAR sensor 606, as illustrated by sensor vision lines 604. Measurements from the planar LiDAR sensor 606 may include a Euclidean distance measurement of a distance between sidewalls 602 of escalator 600, as illustrated by distance measurement 608. Distance measurement 608 may lie beyond drop 610, thereby satisfying a drop parameter for escalator detection as the distance measurement 608 may be at a height of −d with respect to a floor at zero height, as illustrated above in FIG. 3A. The distance measurement 608 may satisfy a minimum width of a spacing parameter requirement for detection of an escalator 600, as illustrated above in FIG. 5. FIG. 6A illustrates an ideal scenario for a robot 102 to detect an escalator 600, wherein robot 102 navigates perfectly orthogonal to the entrance of escalator 600 (e.g., the direction of travel of robot 102 is orthogonal to distance measurement 608). However, in some instances a robot 102 may approach an escalator 600 at an angle not perfectly orthogonal to the entrance. For example, a robot 102 may attempt a turn at an entrance of an escalator 600, wherein distance measurement 608 between two side walls 602 of an escalator may change as illustrated below in FIG. 6B.

FIG. 6B illustrates a top view of a robot 102 approaching an escalator 600 at an angle not perfectly orthogonal to an entrance of the escalator 600, according to an exemplary embodiment. A planar LiDAR sensor 606 may measure a distance measurement 612 between two sidewalls 602 of escalator 600. The distance measurement 612 in FIG. 6B may be larger than the distance measurement 608 in FIG. 6A due to the angle of approach of robot 102 with respect to the entrance of the escalator 600. The distance measurement 608 of a robot 102 approaching an escalator 600 at a perfectly orthogonal angle, as illustrated in FIG. 6A, may provide a minimum distance for the spacing parameter. Accordingly, the larger distance measurement 612 of robot 102 approaching escalator 600 at an angle not perfectly orthogonal to the entrance may still satisfy a spacing parameter of side walls parameters required for escalator detection as the distance measurement 612 meets the minimum distance measure requirement for the spacing parameter.

Setting a minimum distance 608 between side 602 walls of an escalator 600 for a spacing parameter, based on a minimum measurable distance 608 measured by a robot 102 approaching escalator 600 at a perfectly orthogonal angle with respect to an entrance of escalator 600, may enable robot 102 to detect escalator 600 at any angle of approach. Advantageously, the use of the minimum distance requirement for a spacing parameter may further enhance the ability of a controller 118 of robot 102 to determine an escalator 600 at any angle with respect to the entrance of escalator 600.

Figure 7:
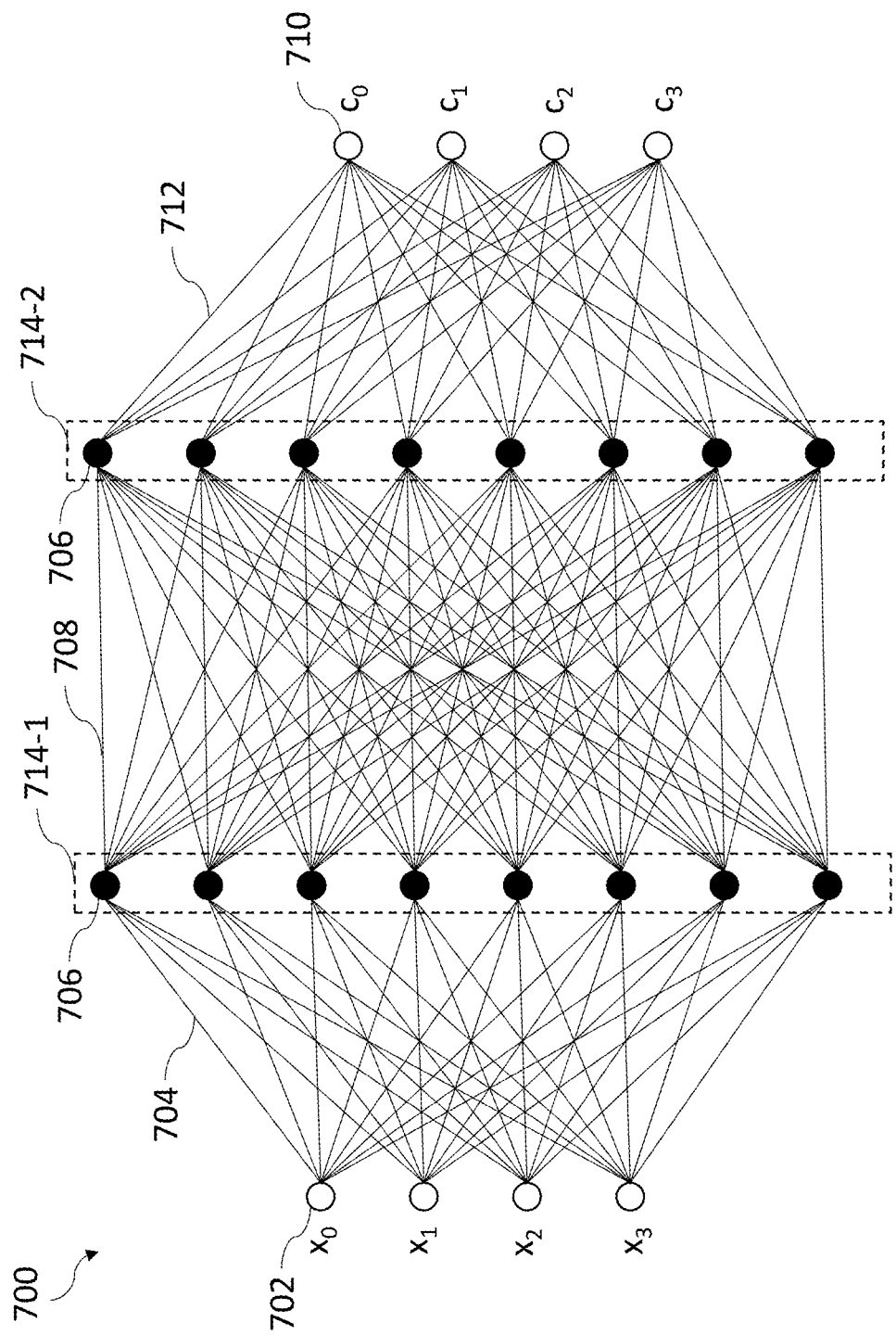
FIG. 7 illustrates a high level diagram of a neural network to be trained to identify escalators in LiDAR scans or images, according to an exemplary embodiment All Figures disclosed herein are © Copyright 2018 Brain Corporation. All rights reserved.

FIG. 7 illustrates a neural network 700, according to an exemplary embodiment that is used in conjunction with the systems and methods of escalator detection discussed above. The neural network 700 may comprise a plurality of input nodes 702, intermediate nodes 706, and output nodes 710. The input nodes 702 being connected via links 704 to one or more intermediate nodes 706. The intermediate nodes 706 are respectively connected via links 708 to one or more other intermediate nodes 706 or via links 712 to output nodes 710. Links 704, 708, 712 are illustrative of the transfer and propagation of numerical data from the input nodes 702 to the output nodes 710 through the neural network 700. The intermediate nodes 706 may form an intermediate layer 714 of the neural network 700. In some embodiments, a neural network 700 may comprise a plurality of intermediate layers 712, intermediate nodes 706 of each intermediate layer 714 being linked to one or more intermediate nodes 706 of adjacent layers, unless an adjacent layer is an input layer (i.e., input nodes 702) or an output layer (i.e., output nodes 710). Each node 702, 706, and 710 may be linked to any number of nodes, wherein linking all nodes together as illustrated is not intended to be limiting.

As used herein, a feature may comprise one or more numeric values (e.g., floating point, decimal, a tensor of values, etc.) characterizing an input from a sensor unit 114 including, but not limited to, detection of an object, parameters of the object (e.g., size, shape color, orientation, edges, etc.), color values of pixels of an image, depth values of pixels of a depth image, distance measurements (e.g., LiDAR scans), brightness of an image, the image as a whole, changes of features over time (e.g., velocity, trajectory, etc. of an object), sounds, spectral energy of a spectrum bandwidth, motor feedback (i.e., encoder values), sensor values (e.g., gyroscope, accelerometer, GPS, magnetometer, etc. readings), a binary categorical variable, an enumerated type, a character/string, or any other characteristic of a sensory input.

The input nodes 706 may receive a numeric value $x_i$ of a feature, i being an integer index. For example, $x_i$ may represent color values of pixels of a color image, distance measurements for a beam ID of index i, a derivative thereof, etc. The input nodes 706 may output the numeric value $x_i$ to one or more intermediate nodes 706 via links 704. Each intermediate node 706 may be configured to receive the numeric value $x_i$ and output another numeric value $k_{i,j}$ to links 708 following the equation 1 below:

$$k_{i,j} = a_{i,j}\, x_0 + b_{i,j}\, x_1 + c_{i,j}\, x_2 + d_{i,j}\, x_3 \qquad \text{(Eqn. 1)}$$

Index i corresponds to a node number within a layer (e.g., $x_1$ denotes the first input node 702 of the input layer, indexing from zero). Index j corresponds to a layer, wherein j would be equal to one for the one intermediate layer 714 of the neural network 700 illustrated, however, j may be any number corresponding to a neural network 700 comprising any number of intermediate layers 712. Constants a, b, c, and d represent weights to be learned in accordance with a training process. The number of constants of equation 1 may depend on a number of input links 704 to a respective intermediate node 706. In this embodiment, all intermediate nodes 706 are linked to all input nodes 702, however this is not intended to be limiting.

Output nodes 710 may be configured to receive at least one numeric value $k_{i,j}$ from at least an $i^{th}$ intermediate node 706 of a $j^{th}$ intermediate layer 714. As illustrated, for example, each output node 710 receives numeric values $k_{0-7,1}$ from the eight intermediate nodes 706 of the second intermediate layer 714, indexing from zero. The output of the output nodes 710 may comprise a classification of a feature of the input nodes 702. The output $c_i$ of the output nodes 710 may be calculated following a substantially similar equation as equation 1 above (i.e., based on learned weights a, b, c, d, etc. and inputs from connections 712 comprising of numeric outputs from intermediate nodes 706 of later 714-2). Following the above example where inputs $x_i$ comprise pixel color values of an RGB image, the output nodes 710 may output a classification $c_i$ of each input pixel (e.g., pixel i is a car, train, dog, person, background, soap, or any other classification).

The training process comprises providing the neural network 700 with both input and output pairs of values to the input nodes 702 and output nodes 710, respectively, such that weights of the intermediate nodes 706 may be determined. The determined weights configure the neural network 700 to receive input to input nodes 702 and determine a correct output at the output nodes 710. By way of illustrative example, annotated (i.e., labeled) images may be utilized to train a neural network 700 to identify objects within the image. The image (i.e., pixel RGB color values) may be provided to input nodes 702 and the annotations of the image (i.e., classifications for each pixel) may be provided to the output nodes 710, wherein weights of the intermediate nodes 706 may be adjusted such that the neural network 700 generates the annotations of the image based on the provided pixel color values to the input nodes 702. This process may be repeated using a substantial number of images (e.g., hundreds or more) such that ideal weights of each intermediate node 706 may be determined. One skilled in the art may appreciate that negative examples, or training pairs which do not comprise of or represent the feature of which the neural network 700 is being trained to identify, may also be utilized to further train the neural network 700 (e.g., training a neural network 700 to identify humans in RGB images may require use of images depicting humans and images depicting no humans).

As another non-limiting exemplary embodiment directed toward escalator detection using planar LiDAR sensors as discussed above in conjunction with FIGS. 2A-2B, 3A-3B, the neural network 700 may be provided with a plurality of training pairs, each comprising of a scan from a LiDAR sensor and either a positive or negative for indication that any respective point/measurement of the scan is of an escalator. That is, the training pairs may each comprise of (i) graphs similar to those illustrated in FIG. 3A-B, wherein each distance measurement 302-i, or derivative 304-i thereof, provided to a respective input node 702-i, and (ii) labels of "escalator" or "non-escalator", or similar variants thereof, provided to a respective output node 710-i which denote each input distance measurement 302-i, 304-i as either escalator or non-escalator. After training of the neural network 700 (i.e., after a model converges or achieves a sufficient accuracy), each input node 702-i may each receive a respective distance measurement 302-i, as illustrated in FIG. 3A, wherein the interconnected layers 714 and learned weights may be configured to cause output nodes 710 to output a positive detection of an escalator if the distance measurements 302 provided are substantially similar to the training scans used to train the neural network 700.

According to at least one non-limiting exemplary embodiment, one or more outputs $k_{i,j}$ from intermediate nodes 706 of a $j^{th}$ intermediate layer 714 may be utilized as inputs to one or more intermediate nodes 706 an $m^{th}$ intermediate layer 714, wherein index m may be greater than or less than j (e.g., a recurrent neural network). According to at least one non-limiting exemplary embodiment, a neural network 700 may comprise N dimensions for an N dimensional feature (e.g., a 3 dimensional input image which includes (x, y) position and depth encoding), wherein only one dimension has been illustrated for clarity. One skilled in the art may appreciate a plurality of other embodiments of a neural network 700, wherein the neural network 700 illustrated represents a simplified embodiment of a neural network and variants thereof and is not intended to be limiting. That is, the neural network 700 is illustrative of basic principals of neural network architecture, training, and operation, wherein the neural network 700 may be embodied in, but is not limited to, feed forward networks, radial bias networks, long/short term memory (LS™), convolutional neural networks, deconvolutional neural networks, and so forth.

Advantageously, due to the standardization of escalator shape and sizes, the pattern of a LiDAR scan of an escalator (e.g., as illustrated in FIGS. 3A-B and 6A-B) maintains a consistent shape (i.e., a U-shape as shown in FIG. 3A). Similarly, the derivative (dH/di) also maintains a consistent shape (i.e as shown in FIG. 3B). Accordingly, due to the consistency in the shape or pattern of the LiDAR scans of escalators, training a neural network 700 to identify the shape or pattern may be advantageous in embodiments where (i) a trained model (i.e., a trained neural network 700 with fixed weights) may be deployed onto a robot 102, or (ii) where robot 102 comprises sufficient computing resources to train and/or execute the neural network 700. Furthermore, the standardization of size and shape of escalators enhances the ability for a neural network 700 to identify escalators in RGB or greyscale imagery and drastically reduces the number of training pairs (i.e., annotated or labeled images of escalators) required to train the neural network 700 to identify escalators in RGB or greyscale images.

According to at least one non-limiting exemplary embodiment, neural network 700 may be trained to identify pixels of images (e.g., RGB images, greyscale images, depth images, etc.) which are escalators or non-escalator pixels. According to at least one non-limiting exemplary embodiment, the neural network 700 may identify an escalator in an image with a bounding box. The training pairs utilized to train the neural network 700 may comprise of annotated or labeled images of escalators, the annotations or labels comprising of an encoding of pixels or regions of the images as either "escalator" or "non-escalator". Advantageously, use of RGB images and neural network 700 may enable robots 102 which do not utilize planar LiDAR sensors to identify escalators at a cost of increased computational complexity imposed on respective one or more controllers 118 or processing devices of the robots 102. Additionally, the use of RGB images and neural network 700 may be utilized to verify the detection of escalators using methods discussed in FIGS. 2-6 above, in order to eliminate false positive detection of escalators.

According to inventive concepts discussed herein, a method, non-transitory computer readable and system for detecting a drop along a traveled path are disclosed. The non-transitory computer readable medium and system comprising a controller configurable to execute computer readable instructions stored on a memory, and method performing steps, comprising, inter alia, receiving data from a first sensor mounted on a robotic device, the data comprising a first distance measurement from the first sensor to a first region; receiving data from a second sensor mounted on the robotic device, the data comprising a second distance measurement from the second sensor to a second region, the second region being different from the first region; computing difference between the first distance measurement and the second distance measurement if value of the second distance measurement is different from value of the first distance measurement, the difference computed corresponds to a magnitude of the drop; and actuating the robotic device to reroute the traveled path by the robotic device if the magnitude of the drop is equivalent to or exceeds a drop parameter. Wherein, the drop parameter corresponds to a mean value of height between the first region and the second region, the first region is stationary and the second region is in motion away from the first region.

The non-transitory computer readable medium, system, and method further comprising, adjusting the magnitude of the drop if there is a calibration error in one or more of the first and second sensors; and detecting sidewall thresholds prior to computing the difference between the first and second distance measurements, wherein the sidewall thresholds corresponds to detecting a first wall and a second wall by one or more of the first and second sensors, the first and second walls being separated by a distance. Wherein the first and second walls are detected based on derivative measurement to determine first and second walls being either on a right or a left side of the robotic device. And, wherein one of the first and second walls being on the left side of the robotic device if the derivative measurement meets a negative wall threshold parameter value, and one of the first and second walls being on the right side of the robotic device if the derivative measurement meets a positive wall threshold parameter value; and wherein the magnitude of the drop is computed irrespective of an angle of the robotic device with respect to the first and second walls.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various exemplary embodiments, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments and/or implementations may be understood and effected by those skilled in the art in practicing the claimed disclosure, from a study of the drawings, the disclosure and the appended claims.

It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least;" the term "such as" should be interpreted as "such as, without limitation;" the term 'includes" should be interpreted as "includes but is not limited to;" the term "example" is used to provide exemplary instances of the item in discussion, not an exhaustive or limiting list thereof, and should be interpreted as "example, but without limitation;" adjectives such as "known," "normal," "standard," and terms of similar meaning should not be construed as limiting the item described to a given time period or to an item available as of a given time, but instead should be read to encompass known, normal, or standard technologies that may be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range may be ±20%, ±15%, ±10%, ±5%, or ±1%. The term "substantially" is used to indicate that a result (e.g., measurement value) is close to a targeted value, where close may mean, for example, the result is within 80% of the value, within 90% of the value, within 95% of the value, or within 99% of the value. Also, as used herein "defined" or "determined" may include "predefined" or "predetermined" and/or otherwise determined values, conditions, thresholds, measurements, and the like.

What is claimed is:

1. A method for detecting a drop along a traveled path, comprising:
   receiving first data from a first sensor mounted on a robotic device, the first data comprising a first distance measurement from the first sensor to a first region;
   receiving second data from the first sensor mounted on the robotic device, the second data comprising a second distance measurement from the first sensor to a second region, the second region being different from the first region;
   computing difference between the first distance measurement and the second distance measurement if value of the second distance measurement is different from value of the first distance measurement, the difference computed corresponds to a magnitude of a drop;
   determine, within the second region, if two side walls are separated by a side wall threshold distance, and the two side walls are present within the second distance measurement and
   actuating the robotic device to reroute the traveled path if the magnitude of the drop is equivalent to or exceeds a drop parameter and upon determining of the two side walls via the side wall threshold distance, the drop parameter being a pre-determined threshold magnitude.

2. The method of claim 1, wherein the drop parameter corresponds to a mean value of height between the first region and the second region, the first region is stationary and the second region is in motion away from the first region.

3. The method of claim 1, further comprising:
   adjusting the magnitude of the drop if there is a calibration error in the first sensor.

4. The method of claim 1, further comprising:
   detecting sidewall thresholds prior to computing the difference between the first and second distance measurements, wherein the sidewall thresholds corresponds to detecting a first wall and a second wall by the first sensor, the first and second walls being separated by a distance.

5. The method of claim 4, wherein the two side walls are detected based on a derivative measurement to determine the two side walls being either on a right or a left side of the robotic device.

6. The method of claim 5, wherein one of the two side walls being on the left side of the robotic device if the derivative measurement meets a negative wall threshold parameter value, and one of the two side walls being on the right side of the robotic device if the derivative measurement meets a positive wall threshold parameter value.

7. The method of claim 4, wherein the magnitude of the drop and the side wall distance threshold is computed irrespective of an angle of the robotic device with respect to the first and second walls.

8. The method of claim 1, wherein, the drop corresponds to an escalator if the drop parameter and the side wall threshold distance are met.

9. A non-transitory computer readable medium, comprising:
   a plurality of instructions stored thereon, that when executed by a controller configure the controller to,
   receive first data from a first sensor mounted on a robotic device, the first data comprising a first distance measurement from the first sensor to a first region;
   receive second data from the first sensor mounted on the robotic device, the second data comprising a second distance measurement from the first sensor to a second region, the second region being different from the first region;
   compute difference between the first distance measurement and the second distance measurement if value of the second distance measurement is different from value of the first distance measurement, the difference computed corresponds to a magnitude of a drop;

determine, within the second region, if two side walls are separated by a side wall distance threshold, and the two side walls are present within the second distance measurement and actuate the robotic device to reroute the traveled path if the magnitude of the drop is equivalent to or exceeds a drop parameter and upon determining of the two side walls via the side wall threshold distance, the drop parameter being a pre-determined threshold magnitude.

10. The non-transitory computer readable medium of claim 9, wherein the drop parameter corresponds to a mean value of height between the first region and the second region, the first region is stationary and the second region is in motion away from the first region.

11. The non-transitory computer readable medium of claim 9, wherein the controller is further configurable to execute the plurality of computer readable instructions to, adjust the magnitude of the drop if there is a calibration error in of the first sensor.

12. The non-transitory computer readable medium of claim 9, wherein the magnitude of the drop and side wall distance threshold is computed irrespective of an angle of the robotic device with respect to the two side walls.

13. The non-transitory computer readable storage medium of claim 9, wherein, the drop corresponds to an escalator if the drop parameter and the side wall threshold distance are met.

14. The non-transitory computer readable medium of claim 9, wherein the two side walls are detected based on a derivative measurement of the second data to determine the two side walls being either on a right or a left side of the robotic device.

15. The non-transitory computer readable medium of claim 14, wherein one of the two side walls being on the left side of the robotic device if the derivative measurement meets a negative wall threshold parameter value, and one of the two side walls being on the right side of the robotic device if the derivative measurement meets a positive wall threshold parameter value.

16. A system for detecting a drop along a traveled path, comprising:

a memory comprising computer readable instructions stored thereon; and at least one controller configurable to execute the computer readable instructions to, receive first data from a first sensor mounted on a robotic device, the first data comprising a first distance measurement from the first sensor to a first region;

receive second data from a first sensor mounted on the robotic device, the second data comprising a second distance measurement from the first sensor to a second region, the second region being different from the first region;

compute difference between the first distance measurement and the second distance measurement if value of the second distance measurement is different from value of the first distance measurement, the difference computed corresponds to a magnitude of a drop;

determine, within the second region, if two side walls are separated by a side wall threshold distance, and the two side walls are present within the second distance measurement; and actuate the robotic device to reroute the traveled path if the magnitude of the drop is equivalent to or exceeds a drop parameter and upon determining of the two side walls via the side wall threshold distance, the drop parameter being a pre-determined threshold magnitude.

17. The system of claim 16, wherein, the drop corresponds to an escalator if the drop parameter and side wall threshold distance are met.

* * * * *